V. L. MARTIN.
GLASS FURNACE.
APPLICATION FILED FEB. 25, 1911.
995,267.
Patented June 13, 1911.
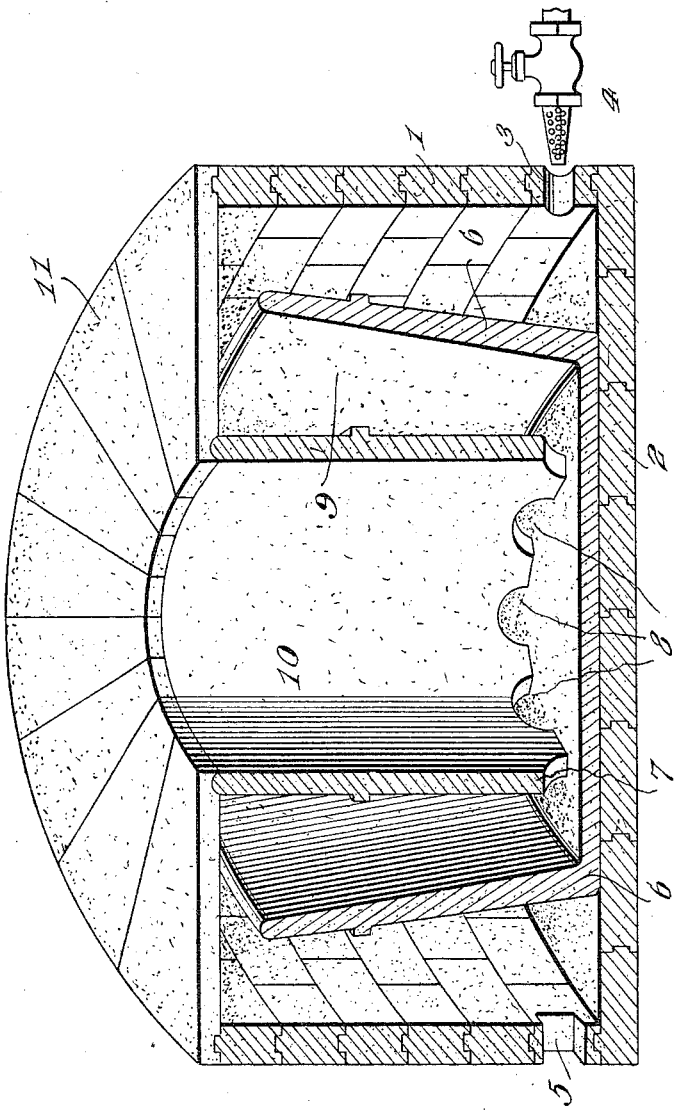
Witnesses
Frank Hugh
V. B. Hillyard.
Inventor
Victor L. Martin,
By Victor J. Evans
Attorney

UNITED STATES PATENT OFFICE.

VICTOR L. MARTIN, OF ARNOLD, PENNSYLVANIA.

GLASS-FURNACE.

995,267.  Specification of Letters Patent. Patented June 13, 1911.

Application filed February 25, 1911. Serial No. 610,814.

*To all whom it may concern:*

Be it known that I, VICTOR L. MARTIN, a citizen of the United States, residing at Arnold, in the county of Westmoreland and State of Pennsylvania, have invented new and useful Improvements in Glass-Furnaces, of which the following is a specification.

This invention has for its object economy of fuel, saving of material and a material reduction of the cost in the production of glass articles.

The invention provides a glass melting furnace of novel structure enabling the attainment of the objects herein stated as well as providing a furnace which is durable and economical in operation.

The invention consists of the novel features, details of construction and combination of parts, which hereinafter will be more particularly set forth, claimed, and illustrated in the accompanying drawing, which is a sectional perspective view of a glass furnace embodying the invention.

The furnace embodies an outer wall 1 and a bed 2, the same being constructed of any refractory material such as commonly employed in the building of furnaces to withstand great heat. A flame opening 3 is provided in the wall of the furnace near the bed thereof for the introduction of flame from a burner 4, it being understood that the furnace illustrated is of the type utilizing gaseous fuel. An outlet 5 is provided in the wall at a point opposite the flame opening 3 and is connected in any manner with the stack so as to create a draft through the furnace. The draft opening 5 is located near the bed of the furnace so as to compel the flame after passing through the furnace to descend before making its exit through the opening 5. The melting pot 6 is located within the furnace and is supported upon the bed 2 and is spaced from the wall 1 to enable the flame and hot air and gases to pass around the pot and over the same. A separating cylinder 7 is located within the pot 6 and is supported upon the bottom thereof. Openings 8 are formed in the lower portion of the separating cylinder to admit of the molten glass passing from the space 9 between the outer wall of the pot and the separating cylinder into the space 10 inclosed by the separating cylinder. The pot 6 and separating cylinder 7 may be of any material commonly employed in the art for constructing devices of this nature. A crown 11 overhangs the outer portion of the glass melting pot and is spaced from the upper edge of the wall thereof and is supported upon the furnace wall 1 and the separating cylinder 7. The crown 11 is of sectional formation and preferably consists of a number of tiles placed in position with their edges abutting. This construction admits of access being readily had to the interior of the furnace for any purpose, since the tiles or sections may be readily removed one at a time. Moreover, any one or more of the sections may be removed to admit of supplying molten glass to the pot when it is required to replenish the same.

In the operation of the invention molten glass is poured into the space 9 formed between the separating cylinder 7 and the outer wall of the pot 6, one or more of the sections of the crown 11 being removed for this purpose. The glass passes from the space 9 through the openings 8 into the space 10 of the separating cylinder. Any impurities and air bubbles in the glass rise to the surface of the glass contained in the space 9, the glass passing into the space 10 being free from impurities and air bubbles, thereby resulting in the production of a superior class of articles. The glass to be worked is obtained from the space 10, being withdrawn through the opening formed by the crown 11. The melting pot 6 is replenished from time to time by pouring molten glass into the space 9 through the opening formed by removal of one or more sections comprising the crown 11.

It will be understood that the melting pot in a furnace of the nature set forth is not required to be handled, hence will last a comparatively long time and moreover the construction admitting of replenishing the melting pot it is not necessary to empty the same after drawing off a considerable quantity of molten glass for a charge. Economy of fuel results since it is not necessary to cool the pot or furnace at frequent intervals such as is necessary in the operation of glass furnaces requiring the melting pot to be emptied and recharged at frequent intervals. The separating cylinder 7 insures a good quality of glass being obtained from the melting pot, hence a superior product, the latter being practically free from flaws, blisters and impurities, such as gravel, which detract from articles containing the same.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A glass melting furnace embodying a bed and an outer wall, a glass melting pot located within the furnace and spaced from the walls thereof, a separating cylinder located within the melting pot and having openings in its lower portion, and a crown extending over the outer portion of the glass melting pot and supported upon the separating cylinder and the furnace wall.

2. A glass furnace comprising a bed, a surounding wall, a glass melting pot placed upon the bed of the furnace and spaced from the wall thereof, a separating cylinder located within the glass melting pot and having openings in its lower portion, and a crown formed of sections extending over the outer portion of the melting pot and supported upon the wall of the furnace and the upper end of the separating cylinder, said crown having its central portion open to admit of the glass being removed from the separating cylinder.

In testimony whereof I affix my signature in presence of two witnesses.

VICTOR L. MARTIN.

Witnesses:
EMIL L. COLIN,
EUGENE A. QUINAUX.